(12) United States Patent
Kim

(10) Patent No.: US 8,767,773 B2
(45) Date of Patent: Jul. 1, 2014

(54) SYSTEM AND METHOD FOR PREVENTING LEAK OF PERSONAL INFORMATION

(75) Inventor: Sangwan Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 131 days.

(21) Appl. No.: 12/973,352

(22) Filed: Dec. 20, 2010

(65) Prior Publication Data

US 2011/0150002 A1    Jun. 23, 2011

(30) Foreign Application Priority Data

Dec. 21, 2009  (KR) .................. 10-2009-0127983

(51) Int. Cl.
*H04J 3/22*       (2006.01)
(52) U.S. Cl.
USPC ........... 370/469; 370/465; 370/474; 709/224; 709/246
(58) Field of Classification Search
None
See application file for complete search history.

(56) References Cited

U.S. PATENT DOCUMENTS

| | | | |
|---|---|---|---|
| 2003/0233328 A1* | 12/2003 | Scott et al. ...................... 705/50 |
| 2008/0225719 A1* | 9/2008 | Korrapati et al. ............. 370/235 |
| 2009/0013407 A1* | 1/2009 | Doctor et al. ................... 726/23 |
| 2009/0092057 A1* | 4/2009 | Doctor et al. ................. 370/252 |

FOREIGN PATENT DOCUMENTS

| | | |
|---|---|---|
| KR | 10-0670826 B1 | 1/2007 |
| KR | 10-2007-0061287 A | 6/2007 |
| KR | 10-2007-0065527 A | 6/2007 |
| KR | 10-2008-0010003 A | 1/2008 |
| KR | 10-0850629 B1 | 8/2008 |
| KR | 10-2009-0045992 A | 5/2009 |

* cited by examiner

*Primary Examiner* — Donald Mills

(57) ABSTRACT

Provided are a system and method for preventing a leak of personal information. According to embodiments of the present invention, when a packet includes a field associated with the personal information, information including the field associated with the personal information may be modified, and thereby may prevent the leak of personal information with respect to a traffic-collecting device in an Internet network system.

8 Claims, 4 Drawing Sheets

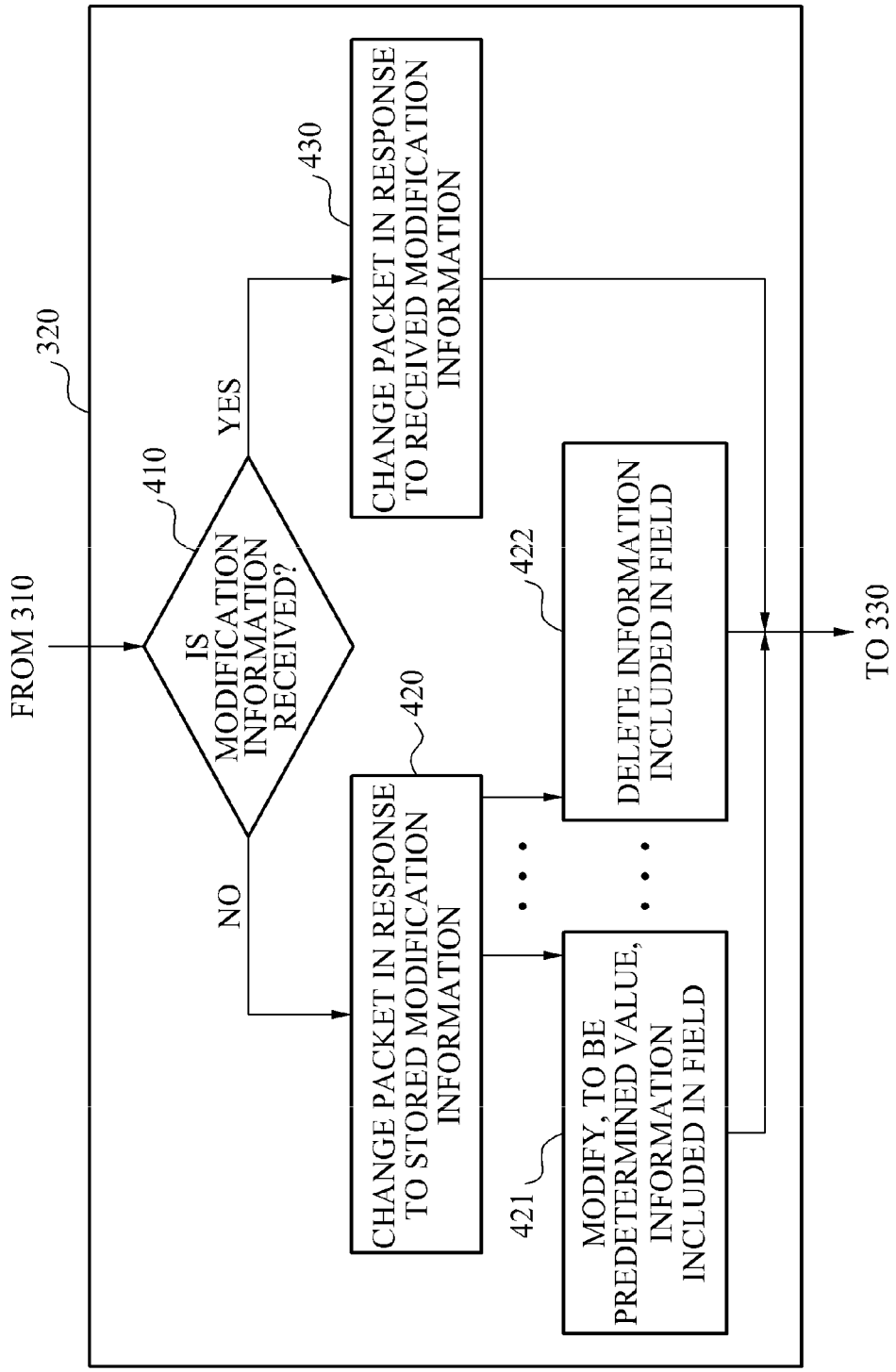

SYSTEM AND METHOD FOR PREVENTING LEAK OF PERSONAL INFORMATION

CROSS-REFERENCE TO RELATED APPLICATION

This application claims the benefit of Korean Patent Application No. 10-2009-0127983, filed on Dec. 21, 2009, in the Korean Intellectual Property Office, the disclosure of which is incorporated herein by reference.

BACKGROUND

1. Field of the Invention

The present invention relates to a system and method for preventing a leak of personal information in an Internet system.

2. Description of the Related Art

Recently, thanks to developments of deep packet inspection technology and high performance of network processors for processing a packet, a traffic collecting and analyzing apparatus that collects and analyzes traffic on the Internet, and uses analyzed information for various purposes such as analysis of user behavior, net management, provision of quality of service (QoS), wiretapping, interception, and the like has been studied and released.

Since Internet traffic is collected and analyzed without a method or policy for protecting personal information, the personal information expressed on the Internet traffic may be leaked.

Recently, in response to leaks of personal information by collecting and analyzing Internet traffic, a personal information protection policy with respect to the Internet traffic has been actively discussed all over the world, and each nation has been trying to form a legal and social consensus.

As a policy for preventing the leak of personal information, a scheme of encrypting the Internet traffic is being used. However, when an encryption key to a system is known, the scheme of encrypting the Internet traffic may not prevent the leak of personal information.

Accordingly, a new policy for preventing the leak of personal information is desired.

SUMMARY

An aspect of the present invention provides a system for preventing a leak of personal information, the system including a packet receiver to receive a packet including a plurality of fields, a packet modifying unit to modify a field associated with the personal information when the field associated with the personal information is included in the plurality of fields, and a packet transmitter to transmit the packet including the modified field.

Another aspect of the present invention also provides a method for preventing a leak of personal information, the method including receiving a packet including a plurality of fields, modifying a field associated with the personal information when the field associated with the personal information is included in the plurality of fields, and transmitting a packet including the modified field.

According to an aspect of the present invention, there is provided a policy for preventing a leak of personal information with respect to a device collecting traffic in an Internet network system, by modifying information included in a field associated with the personal information when a packet has the field associated with the personal information.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 4 is a flowchart illustrating an operation 320 of modifying the field associated with the personal information in FIG. 3.

DETAILED DESCRIPTION

Figure 1:
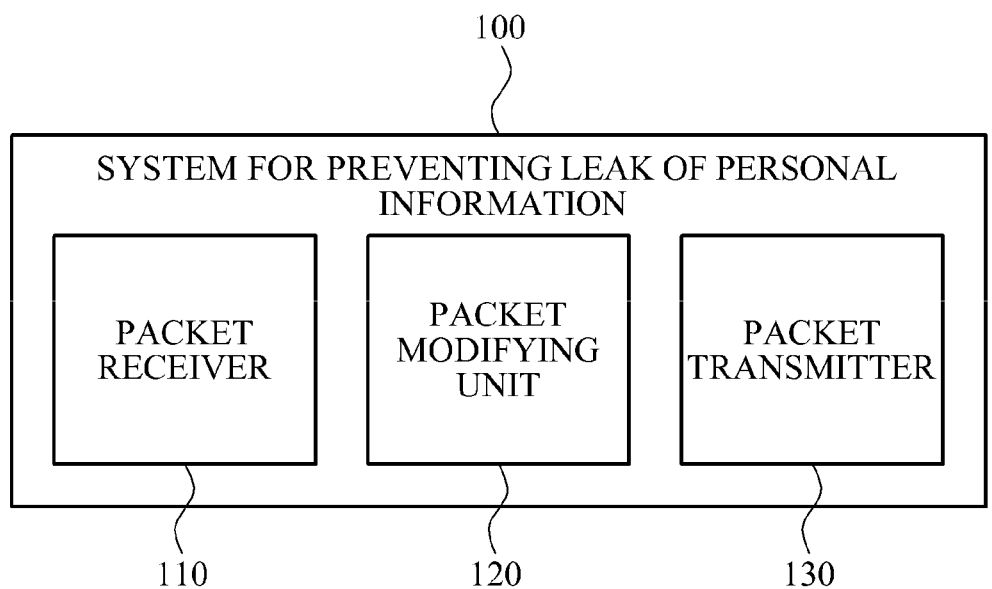
FIG. 1 is a diagram illustrating a configuration of a system for preventing a leak of personal information according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of a system 100 for preventing a leak of personal information according to an embodiment of the present invention.

Referring to FIG. 1, the system 100 for preventing a leak of personal information may include a packet receiver 110, a packet modifying unit 120, and a packet transmitter 130.

The packet receiver 110 may receive a packet including a plurality of fields. Depending on embodiments, the packet receiver 110 may be located between devices collecting the packet or between routers to receive the packet including the plurality of fields from a traffic splitter collecting traffic.

When a field associated with the personal information is included in the plurality of fields, the packet modifying unit 120 may modify the field associated with the personal information.

The personal information may include information about personal details and information about private contents. The personal information may include a source Internet protocol (IP) address and a destination IP address.

Depending on embodiments, the packet modifying unit 120 may modify, to be a predetermined value, information included in the field associated with the personal information. For example, the packet modifying unit 120 may modify, to be 0.0.0.0 corresponding to the predetermined value, an IP address included in a field with respect to the source IP address among fields included in the received packet.

The packet modifying unit 120 may modify information, included in the field associated with the personal information, to be deleted. For example, the packet modifying unit 120 may modify the personal information, included in a payload of the received packet, to be deleted.

According to an embodiment of the present invention, the system 100 for preventing a leak of personal information may further include a storage unit (not shown). The storage unit may store modification information about a scheme for modifying the field associated with the personal information.

The packet modifying unit 120 may modify a field associated with the personal information in response to the modification information stored in the storage unit.

Depending on embodiments, the modification information may include a scheme of modifying information, included in the field associated with the personal information, to be a predetermined value or to be deleted, and a scheme of encrypting the information included in the field associated with the personal information.

The modification information may include field information about a field to be modified among fields associated with the personal information. For example, when the field associated with the personal information, among the plurality of fields included in the packet, corresponds to a field including information about the personal details, a field including information about private contents, and a field including the source IP address, the modification information may include the field information that performs a field modification with respect to the field including information about the personal details, and the field including information about private contents, and does not perform the field modification with respect to the field including the source IP address.

According to an embodiment of the present invention, the system 100 for preventing a leak of personal information may further include an input unit (not shown).

The input unit may receive field information about the field to be modified among fields associated with the personal information. The packet modifying unit 120 may modify a field corresponding to the inputted field information.

The input unit may receive the modification information about the scheme for modifying the field associated with the personal information. The packet modifying unit 120 may modify the field association with the personal information in response to the received modification information. Depending on embodiments, the modification information may include the field information.

The packet transmitter 130 may transmit the packet including the modified field.

Depending on embodiments, the packet transmitter 130 may transmit the packet including the modified field to a device, for example, a traffic analysis server, collecting and analyzing the packet in an Internet network system.

Figure 2:
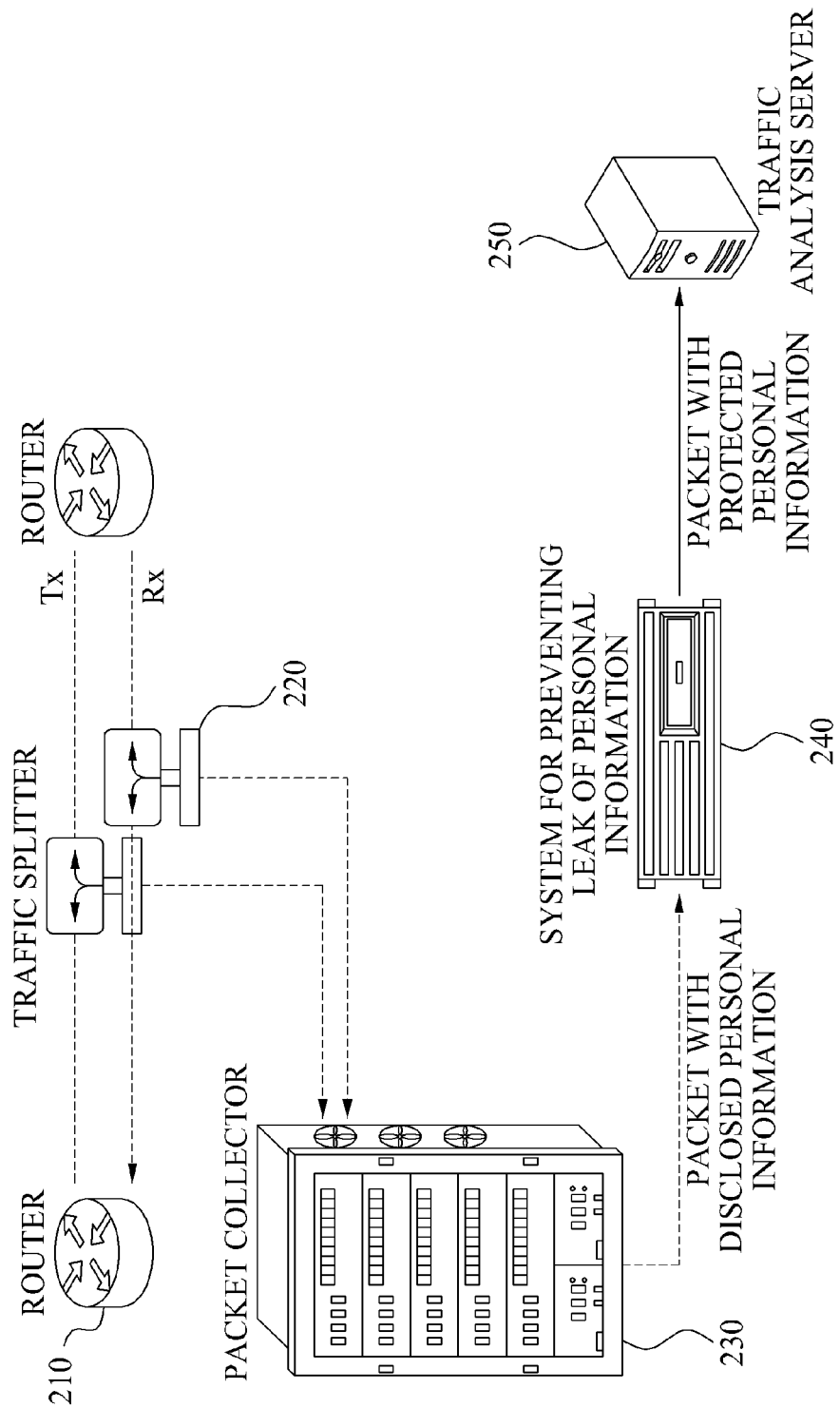
FIG. 2 is a diagram illustrating an Internet network system to which a system for preventing a leak of personal information is applied.

FIG. 2 is a diagram illustrating an Internet network system to which a system for preventing a leak of personal information is applied.

Referring to FIG. 2, the traffic splitter 220 may be located between a router 210 and another router to copy a packet transmitted from the router 210, and to transmit the copied packet to a packet collector 230.

In a case of the packet collected in the packet collector 230, personal information included in the packet is not modified and thus, the packet collector 230 may read the personal information included in the packet. Other packet-collecting devices including the packet collector 230 may read the personal information from the packet.

The packet collector 230 may transmit the packet collected from the traffic splitter 220 to a system 240 for preventing a leak of personal information.

When the received packet includes a field associated with the personal information, the system 240 for preventing a leak of personal information may modify the field associated with the personal information. Since a configuration of modifying the field associated with the personal information has been described with reference to FIG. 1, further description will be omitted.

The system 240 for preventing a leak of personal information may transmit, to a traffic analysis server 250, the packet in which the personal information is processed to be protected. The traffic analysis server 250 may correspond to an embodiment, and the system 240 for preventing a leak of personal information may transmit the packet with protected personal information to a packet-collecting device in the Internet network system.

Since the packet transmitted from the system 240 for preventing a leak of personal information to a traffic-collecting device in the Internet network system including the traffic analysis server 250 may correspond to the packet with the protected personal information, the traffic-collecting device in the Internet network system including the traffic analysis server 250 receiving the pack may not read the personal information from the received packet.

According to an embodiment of the present invention, the system 240 for preventing a leak of personal information may be inserted into the packet collector 230 in a form of a module. The system 240 for preventing a leak of personal information may be inserted, in a form of a module, into network equipment of the Internet network system such as the router 210.

Figure 3:
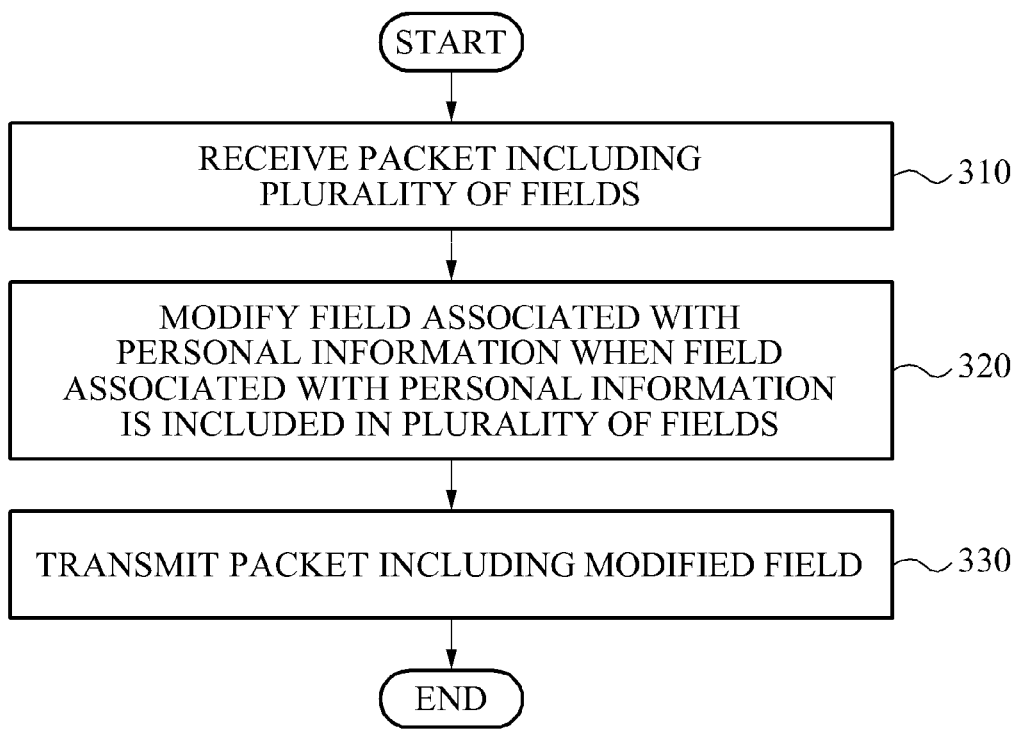
FIG. 3 is a flowchart illustrating a method for preventing a leak of personal information according to an embodiment of the present invention.

FIG. 3 is a flowchart illustrating a method for preventing a leak of personal information according to an embodiment of the present invention.

Referring to FIG. 3, in operation 310, a packet including a plurality of fields may be received.

In operation 320, when a field associated with the personal information is included in the plurality of fields, the field associated with the personal information may be modified.

The personal information may include information about personal details and information about private contents. The personal information may include a source IP address and a destination IP address.

Depending on embodiments, information included in the field associated with the personal information may be modified to be a predetermined value. For example, an IP address included in a field with respect to the source IP address among fields included in the received packet may be modified to be 0.0.0.0 corresponding to the predetermined value.

Information included in the field associated with the personal information may be modified to be deleted. For example, the personal information included in a payload of the received packet may be modified to be deleted.

According to an embodiment of the present invention, the method may further include receiving field information about a field to be modified among a plurality of fields included in the received packet. A field corresponding to the received field information may be modified.

According to an embodiment of the present invention, the method may further include receiving modification information about a scheme for modifying the field associated with the personal information. The field associated with the personal information may be modified in response to the received modification information.

Depending on embodiments, the modification information may include a scheme of modifying information, included in the field associated with the personal information, to be the predetermined value or to be deleted, and a scheme of encrypting the information included in the field associated with the personal information.

The modification information may include field information about a field to be modified among fields associated with the personal information. For example, when a field associated with the personal information, among the plurality of fields included in the packet, corresponds to a field including information about the personal details, a field including information about private contents, and a field including the source IP address, the modification information may include the field information that performs a field modification with respect to the field including information about the personal details, and the field including information about private contents, and does not perform the field modification with respect to the field including the source IP address.

Depending on embodiments, the modification information may include the field information.

In operation 330, the packet including the modified field may be transmitted.

FIG. 4 is a flowchart illustrating operation 320 of modifying the field associated with the personal information in FIG. 3.

Referring to FIG. 4, in operation 410, whether modification information is received may be determined.

In operation 420, when the modification information is determined to be not received, a packet may be changed in response to stored modification information.

In operation 421, when the modification information corresponds to information about a scheme of modifying, to be a predetermined value, information included in the field associated with the personal information, the information included in the field may be modified to be the predetermined value.

In operation 422, when the modification information corresponds to information about a scheme of modifying, to be deleted, information included in the field associated with the personal information, the information included in the field may be modified to be deleted.

In operation 430, when the modification information is determined to be received, the packet may be changed in response to the received modification information.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for preventing a leak of personal information, the system comprising:
   a packet receiver configured to receive a packet comprising a plurality of fields including one or more field which includes personal information of an individual;
   a non-transitory computer readable medium including computer executable instructions stored thereon which, when executed by a computer, perform the following steps:
   determining whether modification information about schemes of modifying the one or more field which includes personal information has been input;
   selecting input modification information if modification information has been input;
   selecting stored modification information if no modification information has been input; and
   modifying the one or more field which includes personal information according to the selected input modification information or the selected stored modification information;
   a storage unit configured to store the modification information; and
   a packet transmitter configured to transmit the packet comprising the modified field,
   wherein the schemes of modifying the one or more field which includes personal information include a scheme of modifying a value in the one or more field including personal information to be a predetermined value, a scheme of deleting the personal information, or a scheme of encrypting the personal information, and
   wherein the one or more field which includes personal information includes at least one of a source IP address or a destination IP address.

2. The system of claim 1, wherein the scheme of modifying a value in the one or more field including personal information to be a predetermined value includes modifying the source IP address included in the packet to be 0.0.0.0.

3. The system of claim 1, wherein the scheme of modifying a value in the one or more field including personal information to be a predetermined value includes modifying the destination IP address included in the packet to be 0.0.0.0.

4. A method for preventing a leak of personal information, the method comprising:
   receiving a packet comprising a plurality of fields including one or more field which includes personal information of an individual;
   determining whether modification information about a schemes of modifying the one or more field which includes personal information has been input;
   selecting input modification information if modification information has been input;
   selecting stored modification information if no modification information has been input;
   modifying the one or more field which includes personal information according to the selected input modification information or the selected stored modification information; and
   transmitting a packet comprising the modified field,
   wherein the stored modification information includes a scheme of modifying a value of the one or more field having the personal information to be a predetermined value, a scheme of deleting the personal information, and a scheme of encrypting the personal information, and
   wherein the one or more field which includes personal information includes at least one of a source IP address or a destination IP address.

5. The method of claim 4, wherein the scheme of modifying a value of the personal information to be a predetermined value includes modifying the source IP address included in the packet to be 0.0.0.0.

6. The method of claim 4, wherein the scheme of modifying a value of the personal information to be a predetermined value includes modifying the destination IP address included in the packet to be 0.0.0.0.

7. The method of claim 4, further comprising:
receiving field information about a field to be modified among the plurality of fields,
wherein modifying the one or more field comprises modifying a field corresponding to the field information.

8. The method of claim 4, further comprising:
receiving modification information about a scheme for modifying the field associated with the personal information,
wherein modifying the one or more field comprises modifying the field associated with the personal information in response to the modification information.

* * * * *